Jan. 5, 1971     E. THIELENHAUS     3,552,063
APPARATUS FOR GRINDING AND HONING OF ANNULAR BODIES
Filed March 26, 1969     4 Sheets-Sheet 1

INVENTOR
ERNST THIELENHAUS
BY Karl F. Ross
ATTORNEY

Jan. 5, 1971  E. THIELENHAUS  3,552,063
APPARATUS FOR GRINDING AND HONING OF ANNULAR BODIES
Filed March 26, 1969  4 Sheets-Sheet 2

INVENTOR
ERNST THIELENHAUS
BY Karl G. R...
ATTORNEY

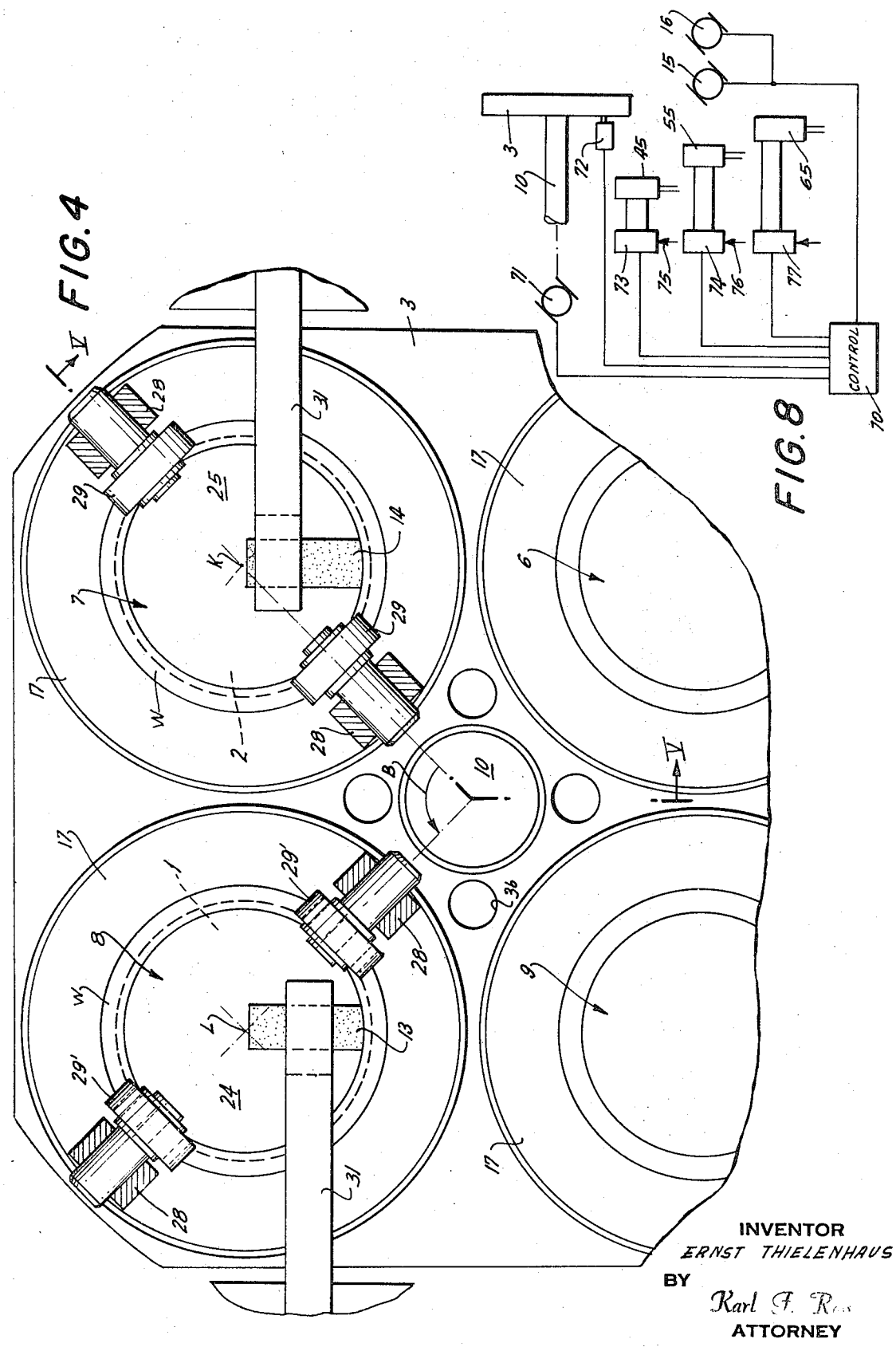

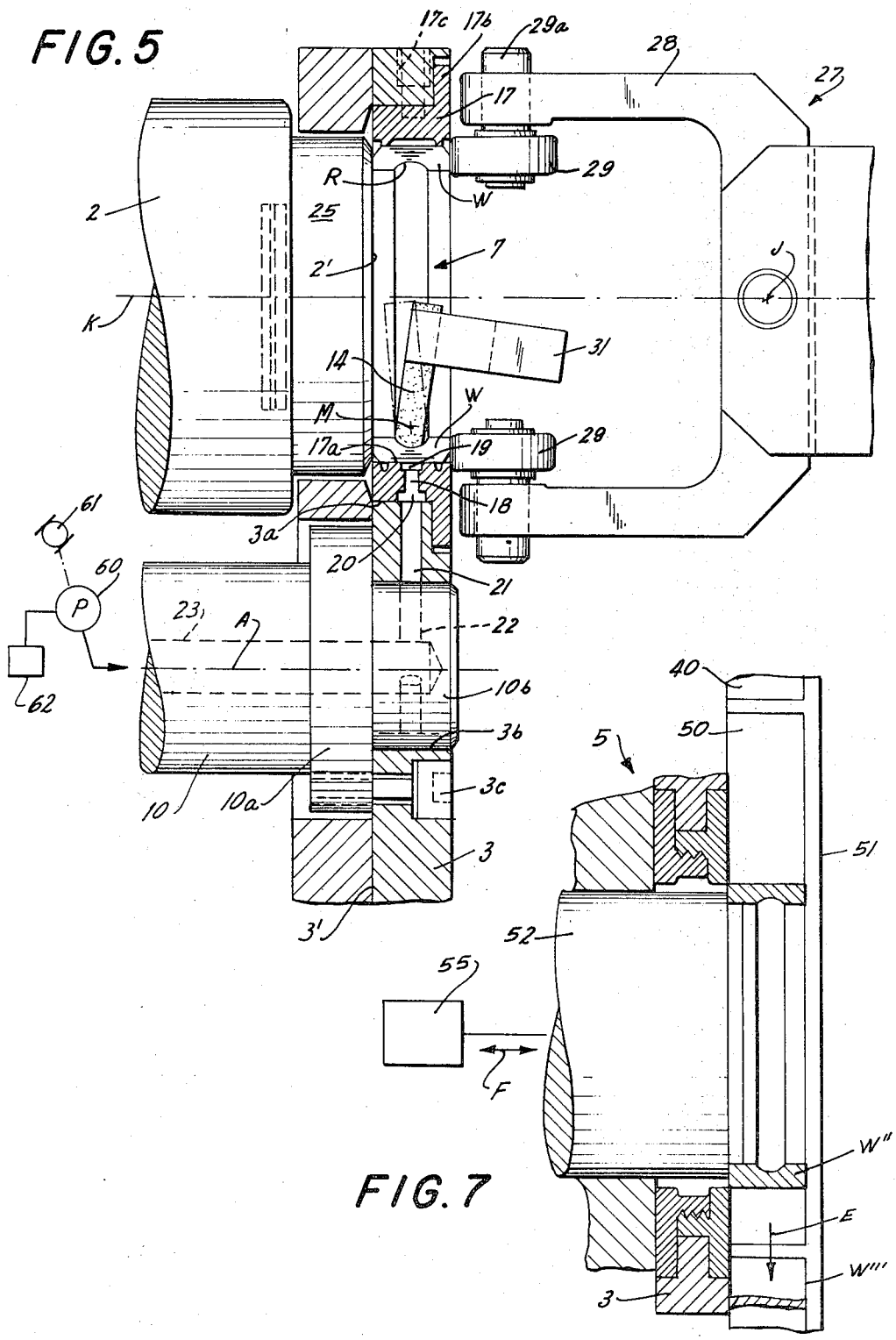

United States Patent Office 3,552,063
Patented Jan. 5, 1971

3,552,063
APPARATUS FOR THE GRINDING AND HONING OF ANNULAR BODIES
Ernst Thielenhaus, Wuppertal-Elberfeld, Germany, assignor to Maschinenfabrik Ernst Thielenhaus, Wuppertal-Barmen, Germany, a corporation of Germany
Filed Mar. 26, 1969, Ser. No. 810,529
Claims priority, application Germany, Mar. 28, 1968, 1,752,064
Int. Cl. B24b 7/00
U.S. Cl. 51—3   10 Claims

ABSTRACT OF THE DISCLOSURE

A system for the internal machining of rings, wherein spindles are juxtaposed with a turret plate and register with seats in the latter for fluid centering of the rings with respect to the spindles. The tools engage the workpieces from the opposite side of the turret plate.

---

My present invention relates to an apparatus for the finishing of annular bodies and, more particularly, to a machine for accurately grinding, honing, polishing and microfinishing ring-shaped bodies such as bearing races along inner surfaces of the ring.

While a number of different machines or devices have been provided heretofore for the finishing of annular bodies, especially bearing rings, the final grinding, polishing or honing, the existing arrangements had all one or more disadvantages arising from the method by which the ring is supported for such machining. When, for example, a chuck or other device is used to retain the ring-shaped workpiece, the jaws of the chuck are angularly spaced about the periphery of the ring and, when tightened, deform the ring into, for example, a generally rectangular body. Internal finishing of a ring held in this manner results in a noncircular race upon release of the workpiece.

Magnetic devices for retaining the ring during the finishing process have the disadvantage that a residual magnetism is found in the workpiece at the conclusion of the machining process and such magnetic remanence can be undesirable in many applications of the workpiece.

In still other arrangements, the workpiece is held against a drive plate and during machining conforms to the configuration of this plate and any unevenness displayed thereby.

It is, therefore, the principal object of the present invention to provide an apparatus for the machining at high rates of circular workpieces such that additional inaccuracies are not reproduced in the workpiece as a result of the way in which the workpiece is held.

Another object of the instant invention is to provide an improved apparatus for machining bearing races and the like internally at high operating rates and with a higher degree of accuracy and circularity than has been possible heretofore.

A further object of the invention is the provision of a machine for the purpose described which will obviate the aforementioned disadvantages and enable the finishing, especially microfinishing, of ring-shaped workpieces with high accuracy and improved-quality surfaces.

I have now found that these objects and others, which will become apparent hereinafter, can be obtained by an apparatus for the finishing of annular bodies, e.g., bearing rings or races and like bodies, wherein a plurality of drive spindles is angularly spaced about an axis to define respective machining stations and each spindle being associated with a respective tool, preferably in the form of a grinding, polishing or honing stone.

The invention provides a magazine or turret in the form of a plate rotatable about this axis and lying perpendicularly thereto and to the axes of the spindles while being formed with a plurality of angularly spaced workpiece-retaining seats respectively alignable with the spindles upon rotation of the turret plate by a turret shaft to which the plate is affixed, the tools being engageable with inner surfaces of the workpieces at the respective finishing stations.

The workpieces are held against the respective spindles and rotatably entrained thereby when the turret carrying the workpieces registers with the spindles axially. Centering of the workpieces with respect to the tools and the spindles is of the fluid type, the principles of which are described in my U.S. Pat. No. 3,082,013, the centering system providing a narrow annular gap between the outer periphery of the workpiece and the respective seat to which fluid is forced under pressure, the fluid preferably being a liquid. Thus all portions of the workpiece are held away from the confronting walls of each seat by a constant fluid pressure and at a constant distance, any deviations being remedied automatically by the pressurized fluid.

At least two such driven spindles are provided at the finishing stations in succession along the path of the turret and are associated with respective grinding, polishing or honing stones of progressively increasing fineness so that each workpiece remains in its assigned seat during the multistage processing by the successive stones thereby preventing nonuniformity or distortion from developing as a result of the change in position of the workpiece from one operation to the next.

According to a feature of this invention, the axes of the spindles and the turret shaft are generally horizontal while the turret plate lies in a vertical plane and the machining head is formed with a workpiece-inserting station having means for successively inserting the workpiece rings into the successive seats prior to rotation of the turret to position each workpiece to the initial machining station; an ejection station is also provided to dislodge, via suitable means, the finished ring-shaped workpiece from each seat before the stepped rotation of the turret to align the empty seat with the input station.

The fluid-centering means of the present invention includes a fluid-distribution duct network or manifold at the junction between the turret shaft and the turret plate to which fluid is delivered by a pump or the like through a passage in the turret shaft. Each seat is formed with one or more annular inwardly open grooves communicating with the fluid distribution network and generating the centering pressure between the exterior of the workpiece and the inwardly facing wall of the respective circular seat. The seat may, therefore, be formed with such grooves and have an annular configuration so as to be received in a suitably dimensioned throughgoing socket in each plate. The seating annuluses may be fixed to the turret plate, e.g., via retaining means such as screws threaded therein or may be rotatable in the turret plate with the ring. In the latter case, the high-pressure fluid forms a lubricant between the turret plate and the seating ring which is freely rotatable with the workpiece.

According to an important feature of this invention, the fluid supplied under pressure to the seats or sockets for the workpieces, is delivered through the turret shaft and is applied continuously even during rotation of the turret between stations to retain the workpiece bodies during such rotation.

In order to insure effective centering of the annular workpieces in the seating rings and to maintain the position of the workpiece during machining, I have found that the pressure in the gap between the workpiece and the inner annular surface of the seating ring should be such, in relation to the pressure and viscosity of the fluid, that at the maximum machining force in the radial direction, as to retain the workpiece body away from the surrounding surface at all points. More specifically, these conditions are realized when a hydraulic medium is used as the fluid, especially oil, and the difference between the internal diameter of the seating ring and the external diameter of the workpiece ranges between 0.05 and 0.02 mm. The hydraulic pressure, in this case, is determined by the relationship described in the aforementioned patent. A pressure sufficient to prevent contact between the external periphery of the workpiece and the inner surface of the seating ring will also suffice to maintain the workpiece in position during movement from station to station from the input means to the discharge means. The insertion and ejection mechanisms may, of course, be of any conventional type.

According to still another feature of the invention, the spindles for driving the workpiece bodies at the machining step have surfaces (of thrust disks) substantially flush with the reverse sides of the turret or magazine while the apparatus is provided along the front side of this plate, at least at the machining stations, with a pressing mechanism designed to retain the workpieces against the spindles. Of course, the spindles can be stepped to receive the workpieces or can be axially shiftable to engage them against an axially fixed supporting member at the front face of the turret plate.

When a pressing arrangement is provided, however, I prefer to make use of a rolling contact between the pressing mechanism and the ring and, to this end, I provide a U-shaped yoke, pivoted at its bight for rotation about an axis perpendicular to the axis of the workpiece body and the spindle but intersecting the latter while the shanks or arms of the U carry diametrically opposed rolls with a common axis perpendicular to the pivoting axis of the workpiece body and to the pivoting axis of the yoke while bearing upon the front face of the workpiece via the rolls mentioned above. The rolls may be simple-retaining members or machining wheels for grinding, polishing or honing the ring as well.

When the system described above is used for microfinishing the interior raceway of a roller-bearing race, I prefer to provide a generally radial machining stone which is carried by an arm or holder extending into the race and having a rounded machining and engaging the raceway generally radially, the apparatus further comprising means for swinging the tool and the holder about an axis corresponding to the center of curvature of the raceway.

An apparatus of this type has the important advantage that it enables a number of finishing steps to be carried out simultaneously without repeatedly engaging and disengaging the workpiece and permits a precise contour to be formed in the workpiece without the inaccuracies resulting from inaccurate positioning thereof for successive operations. This advantage becomes all the more significant when, in accordance with the preferred mode of operation, the seating ring does not rotate with the workpiece. Inexactitude in configuration and dimension, hitherto resulting from the varied means for retaining the workpiece under nonuniform radial pressure, are eliminated and at no time does the workpiece pick up inaccuracies derived therefrom or inaccurate supporting surfaces.

The above and other objects, features and advantages will become more readily apparent from the following description, reference being made to the accompanying drawing in which:

FIG. 4 is a detail view, drawn to an enlarged scale of a portion of the magazine or turret plate of the machine;

FIG. 5 is a cross-sectional view taken along the line V—V of FIG. 4;

FIG. 7 is a view similar to FIG. 6 showing the ring-discharge mechanism; and

FIG. 8 is a diagram of a control system adapted to be used with the apparatus of the present invention.

Figure 1:
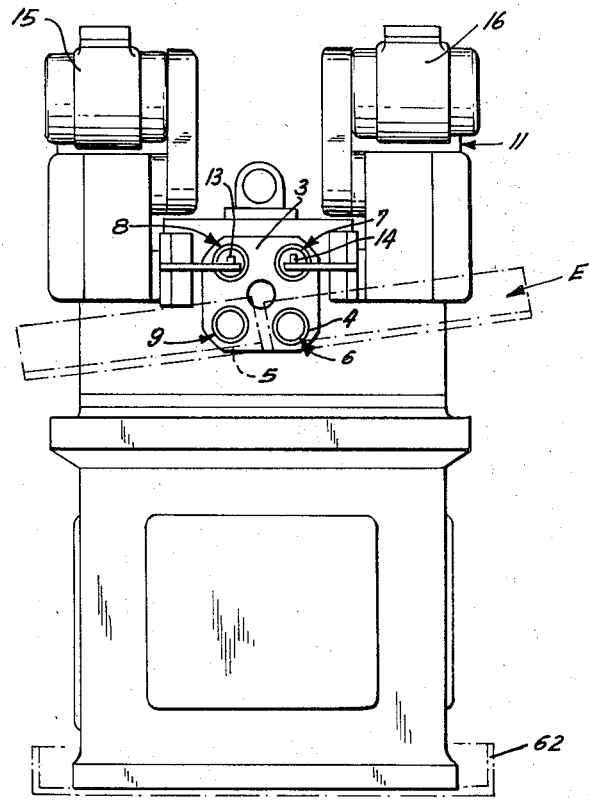
FIG. 1 is a front view of an apparatus embodying the present invention, the supply and discharge chutes being represented in phantom line.

In FIGS. 1–5 of the drawing, I have shown a grinding and polishing machine for annular workpieces, especially for the microfinishing of the interior raceway R of a bearing ring W.

The finishing machine of the present invention comprises a pair of driven spindles 1, 2 (FIGS. 4 and 5) and having front faces, e.g., as represented at 2' substantially flush with the ring face 3' of a turret plate 3. The turret plate 3 is formed with four angularly equispaced sockets 3a in which respective seating rings 17 are disposed, each of these rings being adapted to receive a workpiece W. The turret plate 3 is affixed to a turret shaft 10, which has a flange 10a to which the turret plate 3 is bolted at 3b and a stub 10b extending into an opening 3c in this turret plate. Via the shaft 10, the turret plate 3 is rotatable about the axis A in the counterclockwise direction (FIG. 4) as represented by the arrow B through increments of 90° to successively position each of the seating rings 17 at a charging or input station 4, a first machining station in alignment with the spindle 2, a final machining station in alignment with the spindle 1 and at a discharge station as represented at 5. The seating rings thus define magazine positions 6, 7, 8 and 9, respectively disposed at these stations.

Figure 6:
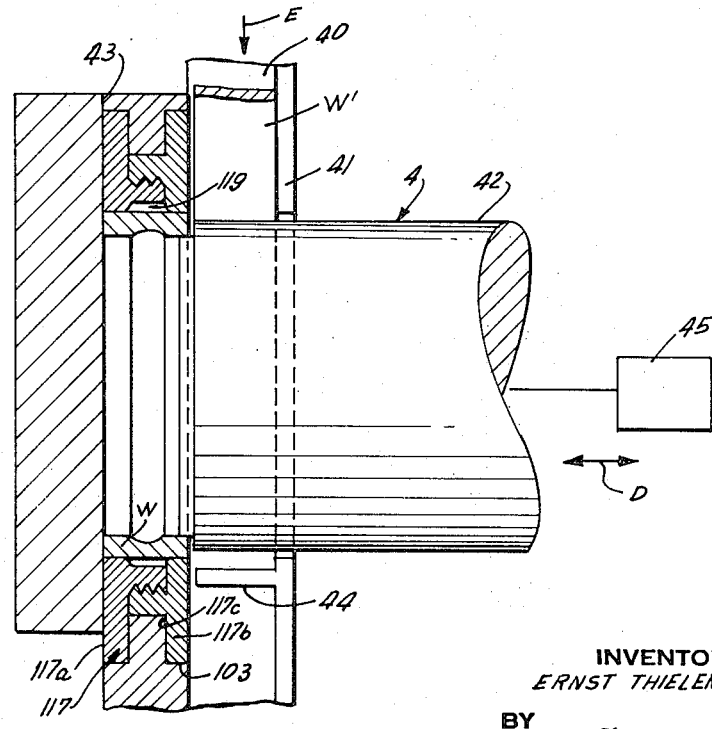
FIG. 6 is a cross-sectional view diagrammatically illustrating the means for introducing the workpiece bodies into the respective station at the input station in accordance with another embodiment of the invention.
Figure 2:
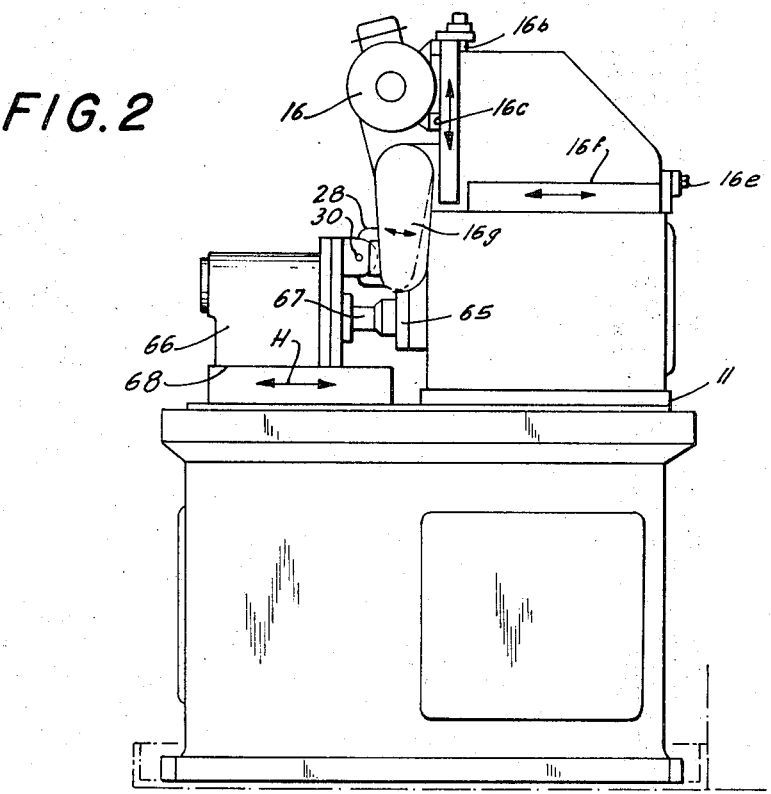
FIG. 2 is a side view of the apparatus of FIG. 1.

As shown in FIG. 6, a workpiece W, rolling down a chute or magazine 40, from which the rings W, W' are prevented from falling by a wall 41, is engaged by a plunger 42 at the input station 4 and shifted axially (to the left) as represented by the arrow D to insert the ring W in the respective seating ring, an abutment surface 43 on the head of the machine forming a stop for the ring W. Upon retraction of the plunger 42, a projection 44 from wall 41 retains the next ring W' in position for insertion on the turret plate 3 when an empty seating ring is positioned in alignment with the plunger 42, the rings rolling down the chute as represented by the arrow E in FIG. 1 and FIG. 6. The plunger 42 is shown to be reciprocable by a fluid responsive cylinder 45.

As represented in FIG. 7, the chute 40 extends beyond the stops 44 to form a ramp 50 whose wall 51 guides machined workpieces W" after they are thrust from the respective seating rings of the turret plate 3 in the discharge position 5. The plunger 52 is reciprocable by a fluid-responsive cylinder 55 as represented by the arrow F when each machined ring is aligned with this plunger 52 upon rotation of the turret plate. Upon retraction of the plunger 52 to the left, the ring W" roll down the ramp in the direction of arrow E as shown for a preceding ring W''' in FIG. 7.

Figure 3:
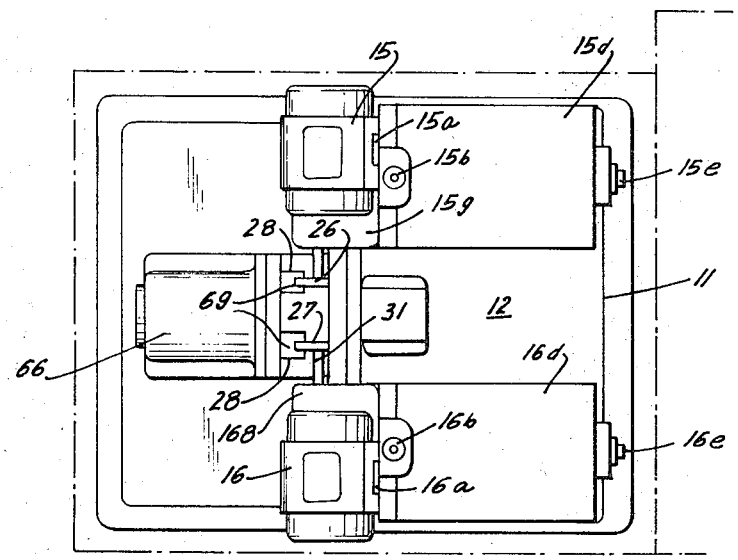
FIG. 3 is a top view thereof.

To drive the spindles 1, 2, the machining head 11 is provided with a drive motor whose adjustable transmission 12 rotates the spindles 1 and 2 (FIG. 3). Each of the spindles is associated with a drive mechanism 15 and 16 mounted upon a carriage 15a, 16a which is vertically shiftable by a leadscrew 15b, 16b on a guideway of the type shown at 16c. The guideway is mounted on a cross slide 15d, 16d displaceable parallel to the access of the spindles by leadscrews 15e and 16e along guideways as shown at 16f on the machining head 11. The drives 15 and 16 are coupled via respective transmission 15g and 16g to the respective portioning stones 13 and 14.

The hydraulic centering and retention of the workpiece W is effected as best shown in FIG. 5 by providing, in each of the seating rings 17, along the inner wall 17a thereof confronting the outer periphery of the workpiece, a multiplicity of annular channels 19, open in the direction of workpiece W.

The hydraulic fluid, e.g., oil, is supplied to the gap between the surface 17a and the workpiece W continuously in each of the seats by a pump 60 driven by motor 61 and drawing the oil from a reservoir 62 which may be the pan shown at the base of the machine in FIG. 1.

The gap between the outer periphery of the workpiece and the confronting wall 17a of each seating ring ranges between 0.02 and 0.05 mm. in terms of the difference in the diameters of the workpiece seating ring, as noted earlier. From the pump 60, the high-pressure oil is delivered to a common bore 23 extending centrally through the turret shaft 10 and terminating in the stub 10b thereof. From the bore 23, a plurality of radial bores 22 extend, thereby forming a manifold, to respective passages 21 provided radially in the turret plate 3 and communicating between the central aperture 3c and the apertures 3a receiving the seating rings 17. The bores 21 thus open into annular peripheral grooves 20 of the seating rings 17 which are snugly received in the sockets 3a and have circumferential flanges 17b retaining the seating rings against axial movement in these sockets. Radial distribution passages 18 connect the outer peripheral groove 20 with the inner peripheral groove 19. Radial screws 17c threaded into a plate 3 fix each seating ring 17 in the plate 3 against rotation.

When it is desired to enable the rings to rotate, the seating rings may be constituted as shown for the ring 117 in FIG. 6. The ring here comprises a pair of threadedly interconnected flange portions 117a and 117b defining clearance 117c with the socket 103 of the turret plate, the fluid being fed to the gap 117c as well as to the space 119 between this ring and the workpiece W by a bore of the type shown at 20, 21 in FIG. 5.

The stationary-seat arrangement ensures a centering of the workpiece in accordance with the envelope constituted by the nonmachined or inexact external periphery, the pressure of the fluid being established such that, under the action of the polishing stones 13 and 14, the workpiece is held out of metallic contact with the seating ring. A pressure of this order of magnitude enables the turret 3 to be rotated to successively bring the workpiece W into registry with the spindle 2, the spindle 1, etc., without dislodgment or change in orientation.

As also can be seen from FIG. 5, the workpieces W, as they arrive at the spindles 1 and 2, are held against thrust or clamping disks 24 and 25 mounted upon the spindles via pressing assemblies represented at 26 and 27. These assemblies, which may be actuated by the pneumatic cylinder 65 (FIG. 2), comprise a carriage 66 to which the piston 67 of this cylinder is connected. The carriage 66 is shiftable in the direction of arrow H parallel to the spindles 1 and 2 along a bed 68 and carries a pair of studs 69 to which respective yokes 28 are pivotally connected at 30 for swinging movement about an axis J perpendicular to the plane of the paper in FIG. 5 and intersecting the axis K of the spindle 2 as illustrated. The pivot 30 allows the yoke 80 to automatically compensate any variations in the pressure with which the rolls 29, journaled on stubs 29a in the arms 28 of the yoke, bear upon the front face $W_f$ of the workpiece. As shown in FIG. 4 for the rolls 29', the rolls may be abrasive wheels designed to machine this front face of the workpiece.

The polishing stones 13 and 14 are each carried at the end of a respective L-shaped holder 31 and can be positioned via a leadscrew 16b or 16e, for example, and project into the interior of the respective ring for swinging movement via their respective holders 16g, etc., about an oscillation point M (FIG. 5) corresponding to the center of curvature of the raceway R polished by the stones in the workpiece.

As can be seen from FIG. 8, a programmer 70 can be provided to control the sequence of operations. Thus the programmer 70 may operate a motor 71 coupled with the turret shaft 10 to angularly displace the turret plate 3 through an angle of 90°, thereby tripping a switch 72 which triggers the programmer 70 to operate a valve 73 and a valve 74 to which pneumatic fluid is supplied under pressure at 75 and 76. The valves 73 and 74 control cylinders 45 and 55 of the workpiece-inserting means and the workpiece-ejecting means respectively as described in connection with FIGS. 6 and 7. In addition, the programmer 70 operates a valve 77 which controls the flow of fluid to the cylinder 65, thereby bringing the pressure members 29 and 29' into engagement with the workpieces W to urge them against the spindle 2 and 1, respectively. The motors oscillating the tools 13 and 14 are represented diagrammatically at 15 and 16 in FIG. 8 and are also started by the programmer 70.

In the operation of the machine illustrated in the drawing, it may be assumed that each of the seating rings 17 has received a respective workpiece W and that the workpiece in position 6 has not yet been polished, that the workpiece in position 7 has received a rough-finishing treatment by the oscillating stone 14, that the workpiece in position 8 has received a microfinish from stone 13 and the workpiece in position 9 has been finished in a previous cycle of operation. The term "microfinish" refers to surfacing wherein the surface roughness maximum is of the order of a micron.

The motor 71, under the control of programmer 70, then angularly steps the shaft 10 to rotate the turret in the counterclockwise sense through 90° (FIG. 4).

Ram 52 advances to the right (FIG. 7) to eject the workpiece W''', newly positioned at 9, onto the chute 40, 50, hence the ring rolls forwardly to a collecting basket.

Simultaneously, the ram 42 is shifted to the left to engage a bearing ring on the ramp 40 to insert it into the empty seat 17 aligned therewith at position 6.

Also, simultaneously with the operation of these rams, the carriage 66 is shifted to the right (FIG. 2) to bring the rolls 29, 29' into engagement with the respective workpieces at positions 7 and 8 and hold them against the thrust disks 25 and 24, respectively, of the spindles 2 and 1. Motors 15 and 16 are operated and the spindles are driven to provide, at station 7, an initial polishing operation and, at station 8, a finishing (microfinish) operation. At the conclusion of these machining steps, the turret 3 is rotated again through 90° and the cycle repeated.

The improvement described and illustrated is believed to admit of many modifications within the ability of persons skilled in the art, all such modifications being considered within the spirit and scope of the invention except as limited by the appended claims.

I claim:

1. An apparatus for the internal machining of annular workpieces, comprising a support; a turret plate mounted on said support and rotatable about an axis perpendicular thereto, said turret plate being formed with a plurality of throughgoing seats angularly spaced about said axis; at least two spindles mounted on said support and registering with said seats upon angular displacement of said turret plate about said axis for engagement with a workpiece positioned in the respective seat; fluid-centering means at each seat for retaining the respective workpiece therein upon registry of said seats with said spindle; and respective machining tools engageable with the interiors of the respective workpieces upon their registry with said spindles for machining same upon rotation of the workpieces by said spindles.

2. The apparatus defined in claim 1 wherein said fluid-centering means includes a source of fluid under pressure, and manifold means connecting said source with each of said seats for delivering fluid thereto under pressure to maintain said workpieces out of engagement with said seats even under the force of said machining tools, said machining tools including a rough grinding stone and a fine grinding stone successively engageable with each of said workpieces upon angular stepping of said turret plate about said axis to advance said workpieces from registry with one of said spindles into registry with another of said spindles.

3. The apparatus defined in claim 2 wherein said turret plate is provided with a turret shaft extending along said axis and forming said manifold means, each of said seats being formed with a socket provided in said turret plate and a seating ring received in the respective socket and accommodating the respective workpiece, said rings each being provided with inwardly open peripheral grooves confronting the outer periphery of a respective workpiece, and at least one fluid passage communicating between said manifold means and said groove.

4. The apparatus defined in claim 3 wherein the internal diameter of each of said rings and the external diameter of each of the workpieces receivable therein have a difference ranging between 0.02 and 0.05 mm.

5. The apparatus defined in claim 3 wherein said spindles are disposed on one side of said turret plate with axes perpendicular thereto and respective pressure disks alignable with said sockets in a multiplicity of angular positions of said turret plate about its axis, said apparatus further comprising pressure means in the region of said spindle along the opposite side of said turret plate for urging said workpieces against said disks upon alignment of the respective seats with said spindles.

6. The apparatus defined in claim 5 wherein each of said pressure means includes a yoke pivoted for swinging movement about an axis perpendicular to and intersecting the axis of the respective spindle and having a pair of arms reaching toward said turret plate, and respective tools engageable with diametrically opposite locations of a respective workpiece and rotatably mounted on said arms.

7. The apparatus defined in claim 3, further comprising means for oscillating said tools about respective centers of curvature located within the respective workpiece.

8. The apparatus defined in claim 3 wherein said turret plate has at least three such seats, said apparatus further comprising ejector means for dislodging a machined workpiece from the respective seat and angularly spaced from said spindles about said axis of said turret plate.

9. The apparatus defined in claim 8 wherein said turret plate has at least four such seats, said apparatus further comprising workpiece-inserting means angularly spaced from the workpiece ejector means about said axis of said turret plate for positioning a new workpiece in one of said seats upon angular displacement of said turret plate after the ejection of a previous workpiece therefrom.

10. The apparatus defined in claim 9 wherein each of said spindles is formed with a pressure disk substantially flush with a rear surface of said turret plate and has an axis of rotation perpendicular to the axis of said turret plate, said apparatus further comprising pressure means including a respective yoke aligned with each of said spindles and having a pair of arms extending in the direction thereof, and respective rolls on said arms engageable with respective workpieces on said tool plate for retaining same against the respective disks.

References Cited
UNITED STATES PATENTS

| | | | |
|---|---|---|---|
| 1,881,244 | 10/1932 | Raule | 51—3 |
| 2,078,416 | 4/1937 | Sauer | 51—3 |
| 2,527,791 | 10/1950 | Brink | 51—108 |
| 3,209,494 | 10/1965 | Seidel | 51—236 |

WILLIAM R. ARMSTRONG, Primary Examiner

U.S. Cl. X.R.

51—108, 134, 58, 236